United States Patent
Le Meur et al.

(10) Patent No.: US 7,245,782 B2
(45) Date of Patent: Jul. 17, 2007

(54) SPATIAL SMOOTHING PROCESS AND DEVICE FOR DARK REGIONS OF AN IMAGE

(75) Inventors: Olivier Le Meur, Talensac (FR); Patrice Alexandre, Cesson Sévigné (FR); Jean-Yves Babonneau, L'Hermitage (FR)

(73) Assignee: Thomson Licensing, Boulogne-Billancourt (FR)

( * ) Notice: Subject to any disclaimer, the term of this patent is extended or adjusted under 35 U.S.C. 154(b) by 792 days.

(21) Appl. No.: 10/433,805

(22) PCT Filed: Nov. 23, 2001

(86) PCT No.: PCT/EP01/13652

§ 371 (c)(1),
(2), (4) Date: Jun. 5, 2003

(87) PCT Pub. No.: WO02/47375

PCT Pub. Date: Jun. 13, 2002

(65) Prior Publication Data

US 2004/0028289 A1 Feb. 12, 2004

(30) Foreign Application Priority Data

Dec. 5, 2000 (FR) .................................. 00 15948

(51) Int. Cl.
*G06K 9/40* (2006.01)
(52) U.S. Cl. ...................... 382/275; 382/260; 382/264; 382/274; 358/3.26; 358/3.27; 358/520
(58) Field of Classification Search ................ 382/260, 382/274, 275, 282, 264, 278; 358/3.26, 3.27, 358/520
See application file for complete search history.

(56) References Cited

U.S. PATENT DOCUMENTS

| 4,245,239 A | | 1/1981 | Richman ...................... 358/37 |
| 4,962,426 A | | 10/1990 | Naoi et al. .................. 358/167 |
| 5,187,754 A | * | 2/1993 | Currin et al. ................ 382/284 |
| 5,353,355 A | * | 10/1994 | Takagi et al. ................ 382/111 |
| 5,442,462 A | * | 8/1995 | Guissin ....................... 358/463 |
| 5,455,870 A | * | 10/1995 | Sepai et al. .................. 382/147 |
| 5,923,775 A | | 7/1999 | Snyder et al. ............... 382/172 |
| 5,929,940 A | * | 7/1999 | Jeannin ....................... 348/699 |
| 6,122,412 A | * | 9/2000 | Noguchi et al. ............. 382/312 |
| 6,134,345 A | * | 10/2000 | Berman et al. ............. 382/162 |
| 6,137,913 A | * | 10/2000 | Kwak et al. ................. 382/236 |
| 6,262,409 B1 | * | 7/2001 | Avaro et al. ............. 250/208.1 |
| 6,625,333 B1 | * | 9/2003 | Wang et al. ................. 382/300 |

FOREIGN PATENT DOCUMENTS

EP 878 776 A1 11/1998

* cited by examiner

*Primary Examiner*—Yosef Kassa
(74) *Attorney, Agent, or Firm*—Joseph J. Laks; Robert B. Levy (57) ABSTRACT

The invention relates to a process, to a device for smoothing dark regions of images and to a coding system.
- a noise level is associated with each image and a luminance value is associated with each pixel,
- a threshold value is calculated,
- at least two values delimiting a smoothing range are defined,
- for each current pixel, the luminance of the pixel is compared with the said values,
- if the luminance of the current pixel lies in a smoothing range, the luminance of several pixels in an analysis window is compared with the said values,
- if the luminance of certain pixels lies in the same range as the value of the luminance of the current pixel, the value of the luminance of the current pixel is modified as a function of the said threshold values.

10 Claims, 6 Drawing Sheets

SPATIAL SMOOTHING PROCESS AND DEVICE FOR DARK REGIONS OF AN IMAGE

This application claims the benefit under 35 U.S.C. § 365 of International Application PCT/EP01/13652, filed Nov. 23, 2001, which claims the benefit of French Patent Application No. 00/15948, filed Dec. 5, 2000.

TECHNICAL FIELD

The present invention relates to a process and to a device for spatial smoothing as well as to a corresponding coding system.

It relates to the noise reduction techniques applied to digital video signals. These techniques are generally applied to digital video images taking the form of a matrix of samples; each sample is composed of a luminance signal and, for a colour signal, of a chrominance signal.

BACKGROUND ART

The acquisition of video image sequences is still today largely carried out in analogue form so that the images, once acquired and possibly transmitted and stored in analogue formats, exhibit an appreciable share of noise in their content. Once digitized, these images are also often subjected to storage/editing operations which, in their turn, introduce noise, this time of a digital nature. Finally, an image sequence generally undergoes a succession of transformations resulting in spatio-temporal noise of a highly random nature.

To obtain high-performance operation, the noise reduction methods call upon recursive filtering which considers the very high temporal correlation of the images of a video sequence. These filters are very effective but have the drawback of making the noise homogeneous and hence of giving the final result a "dirty window pane" effect. This is especially visible in the dark regions of the image.

The invention therefore relates to the homogenization of the dark regions of an image based on the amplitude of the luminance of the pixels of this image.

U.S. Pat. No. 4,962,426 filed in the name of the company Hitachi Limited discloses noise reducing systems which use the amplitude of the luminance. Such systems use the amplitude of the luminance to increase the stringency of the noise reducing filter, in the analogue domain.

Such systems are therefore not adapted for homogenizing the dark regions of an image having undergone a deterioration as they pass through a recursive filter. Moreover, such systems do not allow variable smoothing of an image and are not adapted to operate in the domain of digital images.

BRIEF SUMMARY OF THE INVENTION

The invention therefore proposes a smoothing process based on a noise estimate and on the value of the luminance of each current point which makes it possible to obtain good image quality, while considerably reducing the negative effects alluded to above.

Accordingly, the invention concerns a process for smoothing dark regions of an image sequence having undergone temporal filtering, a noise level being associated with each image, a luminance value being associated with each pixel of an image. According to the invention:

at least one predetermined, so-called threshold value, is calculated as a function of the noise level of the image and the zero value is added to the calculated values, at least two predetermined values are defined which delimit at least one smoothing range, for each pixel of the image, the pixel currently being analysed being referred to as the current pixel, the luminance of the said pixel is compared with the said predetermined values delimiting at least one smoothing range, if the luminance of the current pixel lies in one of the said smoothing ranges, the luminance of a plurality of pixels, the so-called analysis pixels, in a neighbourhood window, the so-called analysis window, centred on the current pixel, is compared with the said values delimiting at least one smoothing range, if the luminance of at least a predetermined minimum number (n) of analysis pixels lies in the same range as the value of the luminance of the current pixel, the value of the luminance of the current pixel is modified as a function of the said threshold values.

Thus the pixels whose luminance is below a certain threshold are smoothed. The pixels are not analysed individually, hence better homogeneity of smoothing is obtained.

The term "neighbourhood" is understood to mean the pixels surrounding the current pixel, currently being analysed. Preferably, the number of pixels surrounding the current pixel will comprise about 10 pixels (advantageously between 7 and 13 inclusive) in each direction and on each side of the current pixel. The neighbourhood may be both a line and column or column or line neighbourhood. It will be readily understood that it is simpler to design a line neighbourhood, the number of points to be traversed and to be stored being restricted in this case.

Moreover, if at least two thresholds are determined, it is possible to perform progressive smoothing depending on the value of the luminance with respect to the two thresholds. Specifically, if the luminance of the current pixel is below a first threshold, that is to say if the luminance is relatively low, then it will be possible to apply a smoothing while taking few constraints into account so that the smoothing is performed as often as possible. If the luminance of the current pixel lies between the two thresholds, that is to say if its luminance is higher, then it will be possible to apply stronger constraints so that the correction is made only in vital cases.

Moreover, a variable stringency is applied to the smoother and the smoothing is modulated. Specifically, the total luminance scale is split up into various regions. Thus the pixels whose luminance is low do not undergo the same smoothing as the pixels whose luminance is high.

According to a particular embodiment, the predetermined so-called threshold values are identical to the predetermined values delimiting at least one smoothing range. Thus the smoothing is made simpler.

According to a particular characteristic, the process is characterized in that the predetermined so-called threshold values are proportional to the noise level of each image. Thus the smoothing takes into account the particular characteristics of each image.

Advantageously, the process is characterized in that the modification of the value of the luminance of the current pixel consists in computing a weighted average of the luminance value of a plurality of the K neighbouring pixels, the so-called processing pixels, and of the current pixel and in allocating the value obtained to the luminance of the current pixel.

In this way, the luminance of the smoothed pixel will be in harmony with the value of the luminance of the neighbouring pixels while limiting the contrast.

According to another characteristic, the smoothing ranges are of different size, the ranges whose luminance is low being wider than those whose luminance is high.

Moreover, the process is characterized in that the predetermined minimum number of analysis pixels varies as a function of the range in which the current pixel is located.

Thus, according to a particular embodiment, for the ranges comprising pixels of high luminance, it is advantageous for n to be higher than for the ranges whose luminance is low. Specifically, since the smoothing is applied only if n pixels are found which belong to the range in the neighbourhood of the current pixel, the more the size of the range decreases and the more n increases, hence the less smoothing will be carried out.

Advantageously, the modification performed on the value of the luminance of the current pixel is different according to the predetermined so-called threshold values.

This has the further advantage of performing a mild smoothing on the pixels whose luminance is higher and a stronger smoothing on the pixels whose luminance is lower.

According to a preferred embodiment, the number M of processing pixels used for the weighted average depends on the threshold values (0, S1, S2) between which the luminance of the current pixel lies. In this way, the size of the processing window used to perform the smoothing varies and the smoothing can be refined.

The invention also relates to a device for smoothing dark regions of an image sequence having undergone temporal filtering, there being a noise level associated with each image, there being a luminance value associated with each pixel of an image. The device according to the invention comprises:
  means for calculating at least one predetermined so-called threshold value as a function of the noise level of the image,
  means of determining two predetermined values delimiting at least one smoothing range,
  means of comparing, for each pixel of the image, the pixel currently being analysed being referred to as the current pixel, the luminance of the said pixel with the said predetermined values delimiting at least one smoothing range,
  means of comparison which, if the luminance of the current pixel lies in one of the said smoothing ranges, compare the luminance of a plurality of pixels, the so-called analysis pixels, in a neighbourhood window, the so-called analysis window, centred on the current pixel, with the said values delimiting at least one smoothing range,
  means of modifying the value of the luminance of the current pixel as a function of the said threshold values if the luminance of at least a predetermined minimum number of analysis pixels lies in the same range as the value of the luminance of the current pixel, the said device being preferably adapted to implement a smoothing process as described above.

The invention also relates to a coding system comprising such a smoothing device.

The invention will be better understood and other features and advantages will become apparent on reading the description of the exemplary embodiments which follow, taken by way of nonlimiting examples, with reference to the appended drawings among which:

DETAIL DESCRIPTION

Figure 1:
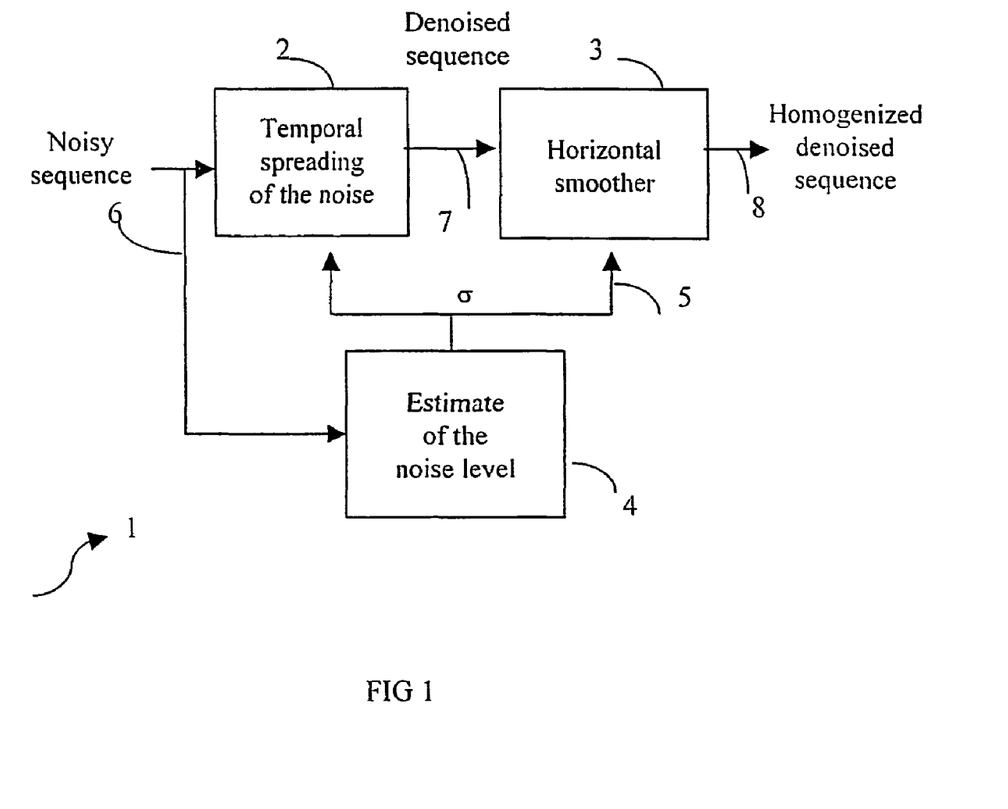
FIG. 1 represents an environment for implementing the device according to the invention.

The system represented in FIG. 1 represents a noise correction system 1 including a smoothing device 3 or smoother. Such a system is implemented upstream of a video coder complying with the MPEG standard, the initials standing for "Motion Picture Expert Group".

We use the following notation:

| | |
|---|---|
| P | current pixel with co-ordinates x and y, |
| V(P) | value of the luminance of the current pixel P, |
| V'(P) | modified value of the luminance of the current pixel P, |
| A and B | constants used for determining the thresholds, |
| σ | estimate of the noise level, |
| FA | analysis window of size 2*K + 1 centred on the current pixel, |
| $FA_1$ | analysis window of size K situated between pixels P − 1 and P − K, |
| $FA_2$ | analysis window of size K situated between pixels P + 1 and P + K, |
| FT | processing window, |
| $FT_1$ | processing window used for the stringent smoothing of size 2M + 1, |
| $FT_2$ | processing window used for the mild smoothing of size 2M' + 1, |
| $\beta_i$ | stringent smoothing coefficient, ($\|i\| <= (FT_1 - 1)/2$) |
| $\alpha_i$ | mild smoothing coefficient, ($\|i\| <= (FT_2 - 1)/2$) |

Such a system 1 receives as input a noisy image sequence 6. This noisy image sequence enters a temporal recursive filter 2 which may or may not be motion compensated and also enters a noise level estimator 4. Such a motion compensated temporal filter is described in the application EP00401558.2 filed in the name of the company Thomson Licensing SA.

This recursive filter produces as a function, among other things, of the estimate of the noise level σ5, a new image sequence 7 whose noise has been reduced but spread, this representing the unpleasant "dirty window pane" effect on the dark regions of the image.

In order to eliminate this "dirty window pane" effect this sequence 7 then undergoes smoothing in the device 3. The smoother 3 receives as input the noise level σ referenced 5 output by the noise estimator 4, which is analysed so as to perform the smoothing of the denoised sequence 7. The noise level σ is associated with an image.

The smoother 3 outputs a new denoised, but also smoothed, sequence 8. This new image sequence 8 can be injected into the input of an MPEG type coder.

Figure 2:
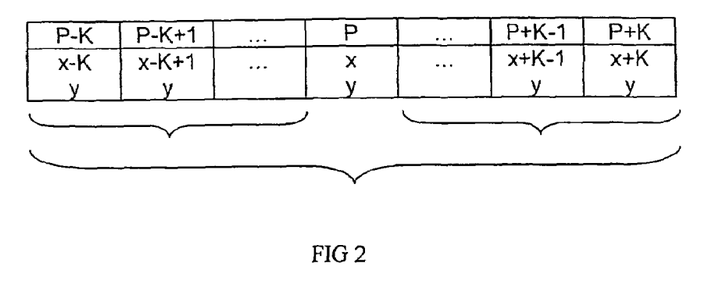
FIG. 2 represents the analysis window used to perform the smoothing.

FIG. 2 describes an analysis window for the current pixel, as used in the smoother 3. In order to perform the smoothing, an analysis window, also referred to subsequently as a neighbourhood or neighbourhood window of the current pixel, is defined around the current pixel to be smoothed. This analysis window is centred on the current pixel. It can be defined in the two directions, horizontal and/or vertical. It is readily understood that for implementational reasons it is simpler to take a horizontal window, that is to say one $$V'(P) = \frac{\beta_M * V(P-M) + \beta_{M-1} * V(P-M+1) + \ldots + \beta_0 * V(P) + \ldots + \beta_{M-1} * \rho V(P+M-1) + \beta_M * V(P+M)}{2 * \sum_{p=i}^{M} \beta_p + \beta_0}$$

which takes into account pixels located on the same line as the current pixel. Specifically, a vertical window and a fortiori a window which takes into account neighbouring columns and lines of the current pixel would require much more memory room when processing the current pixel since it would be necessary to read and especially to store many more pixels than in the case of a horizontal window in order to perform the smoothing.

FIG. 2 represents a particular embodiment in the case where a horizontal analysis window FA is chosen. This analysis window is centred on the current pixel P and is broken into two analysis subwindows FA1 and FA2 of identical size K. The pixel P has as co-ordinates in the image, x along a horizontal axis and y along a vertical axis. The extreme pixels of the analysis window FA therefore have as co-ordinates x−K and x+K along a horizontal axis and y along a vertical axis.

The size of the analysis window is chosen reasonably. Thus for a line of 720 pixels it is reasonable to choose a size of analysis window FA of 15 pixels. In this case, K has the value 7.

Figure 3:
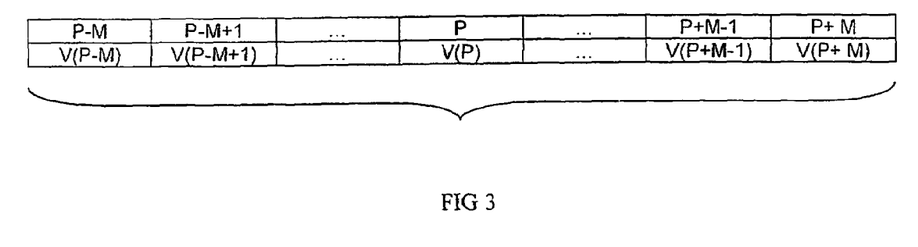
FIG. 3 represents the work window used to perform the smoothing.

FIG. 3 represents a processing window FT of the smoother 3. This window is centred on the current pixel P and is broken down into two processing subwindows FT1 and FT2 of identical size M. According to a particular embodiment, this window is also horizontal, that is to say all the pixels of this window are situated on the same line of the image as the current pixel. Specifically, the processing window FT is a subwindow of the analysis window FA. We therefore have M<K.

Figure 4:
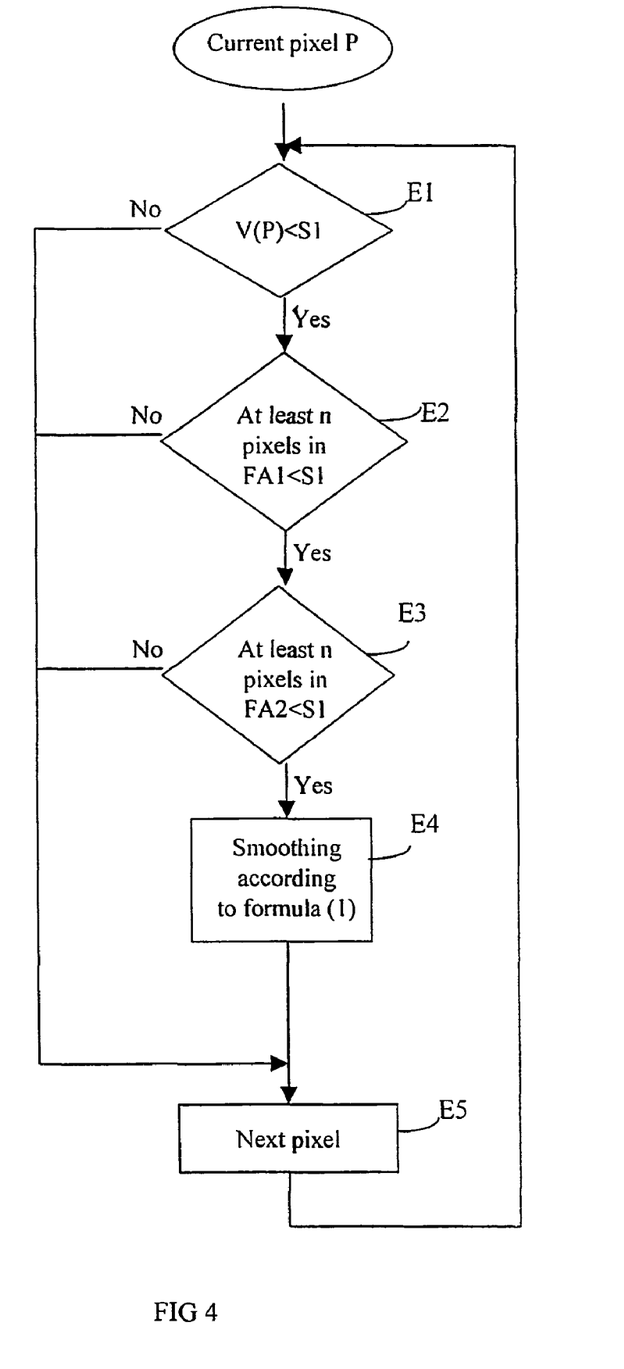
FIG. 4 represents a flowchart for implementing the invention.
Figure 6:
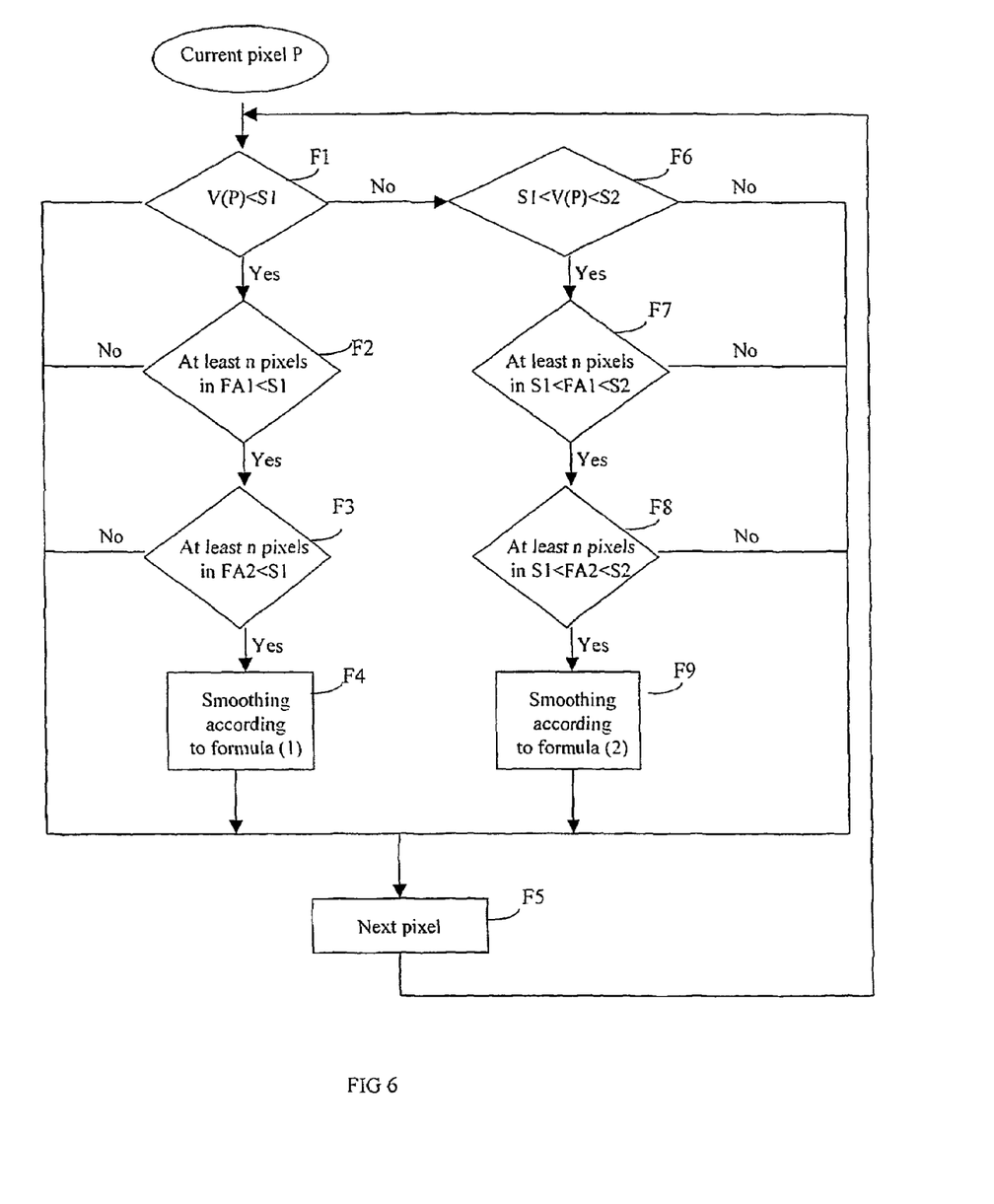
FIG. 6 represents a flowchart of a particular mode of operation of the device according to the invention.
Figure 8:
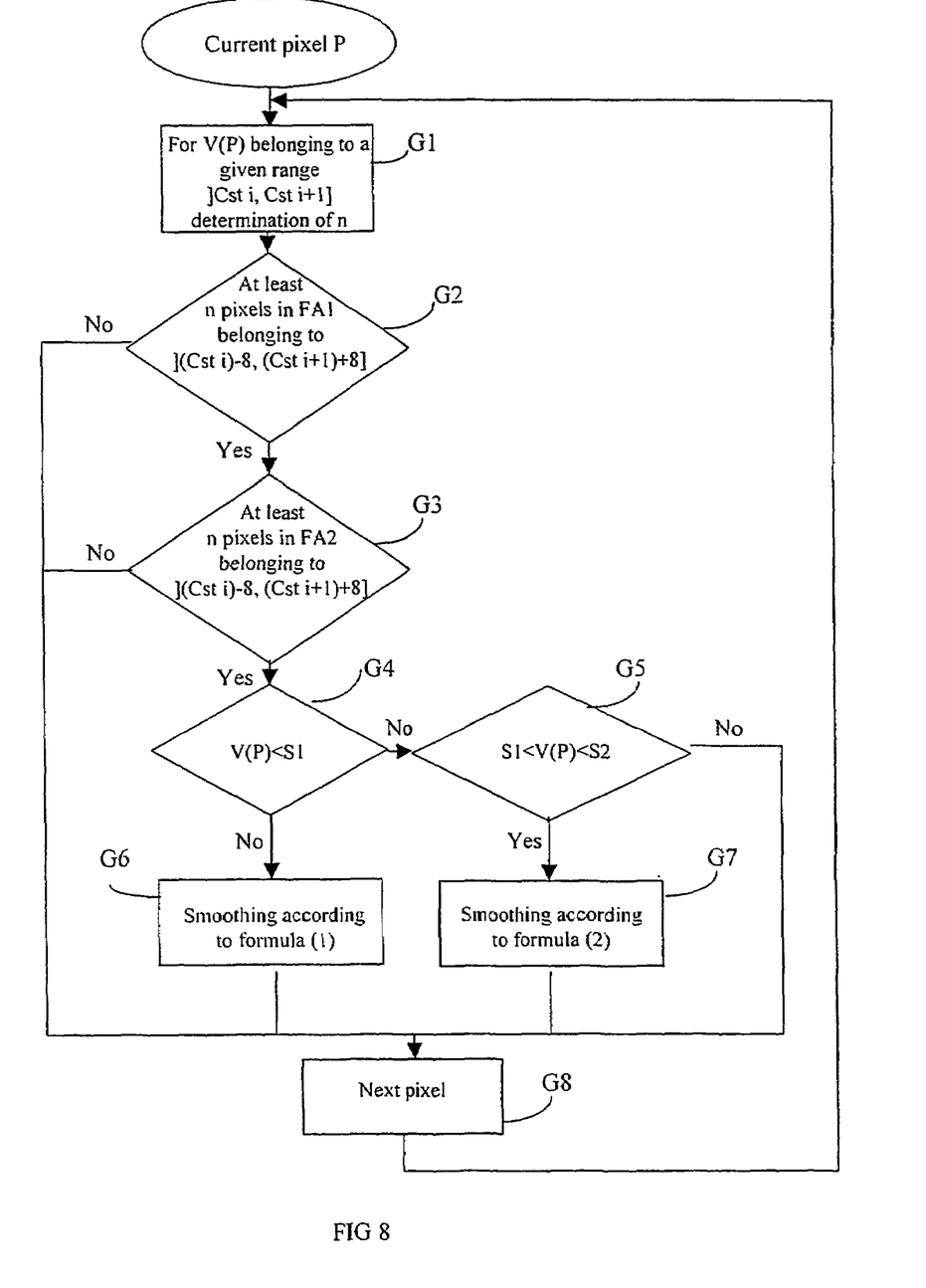
FIG. 8 represents a flowchart for implementing the invention taking into account a splitting of the total luminance scale into various ranges.

The two analysis and processing windows aid the understanding of FIGS. 4, 6 and 8.

FIG. 4 describes a first method of smoothing according to the invention implemented in the smoother 3.

The smoother 3 calculates at least one threshold S1 with each new image. This threshold is calculated as a function of the noise level σ of the image at the input of the recursive coder 2. This noise level is estimated by the device 4 and transmitted to the recursive coder 2 and to the smoother 3. The threshold is proportional to the noise as follows:

S1=σ*A, A being a constant.

In FIG. 4, at step E1, the value of the luminance V(P) of the current pixel is compared with the threshold S1. If this value is above the threshold then the value V(P) is not modified and we go to the next pixel, step E5. If this value is below the threshold then we go to step E2. In the course of step E2, the value of the luminance of the K pixels in the analysis window FA1 is compared with the threshold S1. If n pixels from among the K pixels have a luminance value below the threshold, then we go to step E3, otherwise we go to the next pixel, step E5. In the course of step E3, the value of the luminance of the K pixels in the analysis window FA2 is compared with the threshold S1. If n pixels from among the K pixels have a luminance value below the threshold, then we go to step E4, otherwise we go to the next pixel, step E5. N is preferably greater than K/2. In the course of step E4, the value of the luminance of the current pixel is modified according to the following formula (1):

The coefficients $\beta_i$ are the weighting coefficients of the filter. The index i lies between [0, +M].

In step E5, we go to the next pixel, then we go back to step E1 until the entire image has been traversed. When the entire image has been smoothed, we go to the next image and we calculate a new threshold as a function of the noise level σ of the current image.

Figure 5:
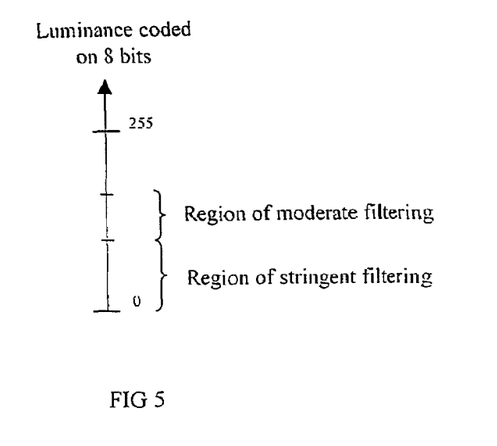
FIG. 5 represents a splitting of the luminance values into three regions.

FIG. 5 shows an improvement to the splitting of the total luminance scale by defining two thresholds S1 and S2. Specifically, the use of a single threshold simplifies the smoother, but for the pixels whose luminance is close to the threshold, there is a risk of this being manifested visually as a temporal oscillation between the smoothed effect and non-smoothed effect.

In a particular embodiment, the smoother 3 calculates two thresholds called S1 and S2. These thresholds are calculated as a function of the noise level σ of the image at the input of the recursive filter 2. This noise level is estimated by the device 4 and transmitted to the recursive coder 2 and to the smoother 3. The thresholds are proportional to the noise as follows:

S1=σ*A

S2=σ*B with B>A hence S2>S1.

A and B being constants, the larger A and B are, the more the image is smoothed since all the pixels whose luminance value is below S1 or S2 are smoothed according to the flowchart of FIG. 6 described later.

FIG. 6 illustrates an embodiment using two thresholds S1 and S2.

In step F1, the value of the luminance V(P) of the current pixel is compared with the threshold S1. If this value is above the threshold S1, then we go to step F6. If this value is below the threshold S1, then we go to step F2. In the course of step F2, the value of the K pixels in the analysis window FA1 is compared with the threshold S1. If n pixels from among the K have a luminance value below the threshold S1, then we go to step F3, otherwise we go to the next pixel, step F5. In the course of step F3, the value of the luminance of the K pixels in the analysis window FA2 is compared with the threshold S1. If n pixels from among the K have a luminance value below the threshold S1, then we go to step F4, otherwise we go to the next pixel, step F5. In the course of step F4, the value of the luminance of the current pixel is modified according to the following formula (1):

$$V'(P) = \frac{\beta_M * V(P-M) + \beta_{M-1} * V(P-M+1) + \ldots + \beta_0 * V(P) + \ldots + \beta_{M-1} * V(P+M-1) + \beta_M * V(P+M)}{2 * \sum_{p=i}^{M} \beta_p + \beta_0}$$

The coefficients $\beta_i$ are the weighting coefficients of the filter. The index i lies between [0, +M].

In step F6, the value of the luminance of the current pixel is compared with the thresholds S1 and S2. If this value lies between S1 and S2 we go to step F7, otherwise we go to step F5. In the course of step F7, the value of the luminance of n pixels from among the K in the analysis window FA1 is compared with the thresholds S1 and S2.

If n pixels have a luminance value above the threshold S1 and below the threshold S2, then we go to step F8, otherwise we go to the next pixel, step F5. In the course of step F8, the value of the luminance of n pixels in the analysis window FA2 is compared with the thresholds S1 and S2. If n pixels have a luminance value above the threshold S1 and below the threshold S2, then we go to step F9, otherwise we go to the next pixel, step F5. In the course of step F9, the value of the luminance of the current pixel is modified according to the following formula (2):

$$V'(P) = \frac{\alpha_{M'} * V(P-M') + \alpha_{M'-1} * V(P-M'+1) + \ldots + \alpha_0 * V(P) + \ldots + \alpha_{M'-i-1} * V(P+M'-1) + \alpha_{M'} * V(P+M')}{2 * \sum_{p=1}^{M'} \alpha_p + \alpha_0}.$$

M'=(FT2-1)/2, FT2 represents the size of the processing window and FT2<=FT1.

The coefficients $\alpha_i$ are the weighting coefficients of the filter. The index i lies between [0, +M'].

In step F5, we go to the next pixel, then we go back to step F1 until the entire image has been traversed. When the entire image has been smoothed, we go to the next image and we calculate new thresholds as a function of the noise level σ of the current image.

Figure 7:
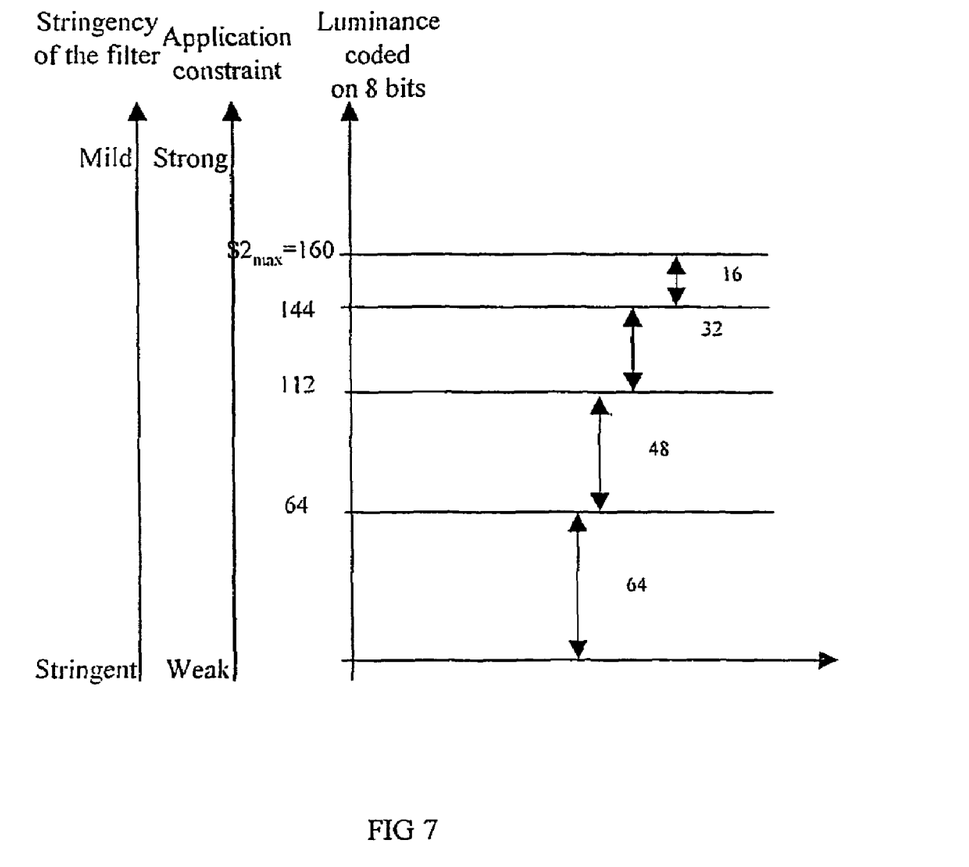
FIG. 7 represents a splitting of the total luminance scale into various ranges.

In FIG. 7, the total luminance scale is broken down into various ranges.

Specifically, the applicant has noted that the solutions presented in the two flowcharts of FIGS. 4 and 6 exhibited the advantage of being very simple but could, according to a variant, be more effective. Specifically, if the total luminance scale is split into various ranges, it is possible to adjust the constraints of application of the smoother.

FIG. 7 shows a breakdown of the total luminance scale into four ranges.

The ranges whose luminance is low are of larger sizes than the ranges whose luminance is high. A high luminance corresponds to a bright region and a low luminance corresponds to a dark region. The lower the luminance, the weaker the constraints of application of the smoother will be, that is to say the more the parameter n will change. The greater the luminance, the more n will increase, that is to say it will be necessary for there to be more pixels complying with the application criteria of the filter in the range of the current pixel in order for the smoothing to be applied.

Moreover, since the size of the range decreases as the luminance increases, it will be more and more difficult to find n pixels in an ever narrower range, the filter is thus applied more flexibly in respect of the dark regions than in respect of the bright regions of the image.

To do this, a certain number (p) of nonuniform ranges of luminance amplitude are defined:
a range 1 from 0 to Cst 1
a range 2 from Cst 1 to Cst 2
a range 3 from Cst 2 to Cst 3
. . .
a range p from Cst (p−1) to Cst p
(with $S2_{max}$>Cst p> . . . >Cst 2>Cst 1>0)

Thus, in FIG. 7 the total luminance scale is split into four ranges for example.

A first range whose extreme values are 0 and 64. A second range whose extreme values are 64 and 112, of size 48. A third range whose extreme values are 112 and 144 of size 32 and a fourth range whose extreme values are 144 and 160 of size 16.

Depending on the range [Cst i, Cst i+1](0<=i<p) in which the value V of the luminance of the current pixel is situated, the conditions of application of the smoother are made more or less stringent. The values of n for the various ranges will for example be as follows:
for the range [Cst 0, Cst 1], n=3
for the range ]Cst 1, Cst 2], n=4
. . .
for the range ]Cst p, Cst p+1], n=7

FIG. 8 gives a flowchart for the operation of this second variant of the invention described in FIG. 7.

In step G1, the smoother determines the range in which the current pixel is located while smoothing the value of the luminance of the current pixel. It thus determines the value of n, the values of n being predetermined in the smoother and associated with a range.

Then, in step G2, the smoother examines the pixels of the analysis window FA1 and determines whether at least n pixels from among the K pixels of the window FA1 belong to the same range as the current pixel enlarged by 16 pixels (8 above and 8 below). The range is enlarged by 16 pixels, 16 being given by way of indication and so as to deal with the particular cases where the value of the current pixel is just above or below the bounds defining the range. If at least n pixels belong to the said extended range, then we go to step G3, otherwise we go to step G8.

In step G3, the smoother examines the pixels of the analysis window FA2 and determines whether at least n pixels from among the K pixels of the window FA2 belong to the same range as the current pixel, enlarged by 16. If at least n pixels belong to the said extended range, then we go to step G4, otherwise we go to step G8.

In step G4, the value of the luminance of the current pixel is compared with the threshold S1. If this value is below or equal to S1, then we go to step G6; otherwise we go to step G5.

In the course of step G5, the value of the luminance of the current pixel is compared with the thresholds S1 and S2. If this luminance value is above the threshold S1 and below the threshold S2, then we go to step G7, otherwise we go to the next pixel, step G8. In the course of step G6, the value of the luminance of the current pixel is modified according to the following formula (1):

$$V'(P) = \frac{\beta_M * V(P-M) + \beta_{M-1} * V(P-M+1) + \ldots + \beta_0 * V(P) + \ldots + \beta_{M-1} * V(P+M-1) + \beta_M * V(P+M)}{2 * \sum_{p=i}^{M} \beta_p + \beta_0}$$

The coefficients $\beta_i$ are the weighting coefficients of the filter. The index i lies between [0, +M].

In the course of step G7, the value of the luminance of the current pixel is modified according to the following formula (2):

$$V'(P) = \frac{\alpha_{M'} * V(P-M') + \alpha_{M'-1} * V(P-M'+1) + \ldots + \alpha_0 * V(P) + \ldots + \alpha_{M'-i-1} * V(P+M'-1) + \alpha_{M'} * V(P+M')}{2 * \sum_{p=1}^{M'} \alpha_p + \alpha_0}.$$

M'=(FT2-1)/2, FT2 represents the size of the processing window and FT2<FT1.

The coefficients $\alpha_i$ are the weighting coefficients of the filter. The index i lies between [0, +M'].

In step G8, we go to the next pixel, then we go back to step G1 until the entire image has been traversed. When the entire image has been smoothed, we go to the next image and we calculate new thresholds as a function of the noise level σ of the current image.

What is claimed is:

1. Process for smoothing dark regions of an image sequence having undergone temporal filtering, a noise level being associated with each image, a luminance value being associated with each pixel of an image, wherein, at least one predetermined threshold value is calculated as a function of the noise level of the image and a zero value is added to the calculated values, at least two predetermined limiting values which delimit at least one smoothing range, for each pixel of the image, the pixel currently being analyzed being referred to as the current pixel, the luminance of the said pixel is compared with the said predetermined limiting values delimiting, if the luminance of the current pixel lies in one of the said smoothing ranges, the luminance of a plurality of analysis pixels, in a neighborhood window, centered on the current pixel, is compared with the said limiting values, if the luminance of at least a predetermined minimum number of analysis pixels lies in the same range as the value of the luminance of the current pixel, the value of the luminance of the current pixel (P) is modified as a function of the said at least one threshold value.

2. Process according to claim 1, wherein at least one predetermined limiting value is identical to the at least one predetermined threshold value.

3. Process according to claim 1 wherein the at least one predetermined threshold value is proportional to the noise level.

4. Process according to claim 1 wherein the modification of the value of the luminance of the current pixel comprises the steps of computing a weighted average of the luminance value of a plurality of the neighboring analysis pixels, the processing pixels, and of the current pixel and in allocating the value obtained to the luminance of the current pixel.

5. Process according claim 1 wherein the smoothing ranges are of different size, the ranges whose luminance is low being wider than those whose luminance is high.

6. Process according to claim 1, wherein the predetermined minimum number of analysis pixels varies as a function of the range in which the current pixel is located.

7. Process according to claim 1, wherein the modification performed on the value of the luminance of the current pixel is different for different threshold values.

8. Process according to claim 1, wherein the number of processing pixels used for the weighted average depends on threshold values between which the luminance of the current pixel lies.

9. Device for smoothing dark regions of an image sequence having undergone temporal filtering, a noise level being associated with each image, there being a luminance value being associated with each pixel of an image, said device comprising, means for calculating at least one predetermined so-called threshold value as a function of the noise level of the image, means of determining two predetermined values delimiting at least one smoothing range, means of comparing, for each pixel of the image, the pixel currently being analyzed being referred to as the current pixel the luminance of the said pixel with the said predetermined values delimiting at least one smoothing range, means for comparison which, if the luminance of the current pixel lies in one of the said smoothing ranges, then comparing the luminance of a plurality of pixels, the analysis pixels, in a neighborhood window, the analysis window centered on the current pixel, with the said values delimiting at least one smoothing range, means for modifying the value of the luminance of the current pixel as a function of the said threshold values if the luminance of at least a predetermined minimum number of analysis pixels lies in the same range as the value of the luminance of the current pixel.

10. Coding system comprising a smoothing device in accordance with claim 9.

* * * * *